United States Patent [19]

Shuba

[11] 3,729,722

[45] Apr. 24, 1973

[54] DYNAMIC MODE INTEGRATED CIRCUIT MEMORY WITH SELF-INITIATING REFRESH MEANS

[75] Inventor: Joseph Patrick Shuba, Naperville, Ill.

[73] Assignee: GTE Automatic Electric Laboratories Incorporated, Northlake, Ill.

[22] Filed: Sept. 17, 1971

[21] Appl. No.: 181,443

[52] U.S. Cl. ......340/173 R, 340/172.5, 340/173 CA

[51] Int. Cl. ..............................................G11c 7/00

[58] Field of Search..................340/173 CA, 173 PL, 340/173 R, 172.5

[56] References Cited

UNITED STATES PATENTS

| | | | |
|---|---|---|---|
| 3,631,408 | 12/1971 | Hachioji-shi | 340/173 CA |
| 2,823,368 | 2/1958 | Avery | 340/173 CA |
| 3,387,286 | 6/1968 | Dennard | 340/173 CA |

*Primary Examiner*—Bernard Konick
*Assistant Examiner*—Stuart Hecker
*Attorney*—K. Mullerheim et al.

[57] ABSTRACT

An integrated circuit memory operated in the dynamic mode is provided with a clock controlled refresh pulse generator, address counter and gating arrangement to periodically refresh the contents of each memory cell.

8 Claims, 2 Drawing Figures

INVENTOR
J. PATRICK SHUBA
BY Robert Van Epps
ATTORNEY

DYNAMIC MODE INTEGRATED CIRCUIT MEMORY WITH SELF-INITIATING REFRESH MEANS

BACKGROUND OF THE INVENTION

1. Field of the Invention

The present invention relates generally to the field of digital data processing and more particularly to a dynamic mode integrated circuit memory having a self-initiating data refresh means.

2. Description of the Prior Art

With the continuing growth of metal oxide semiconductor (MOS) and metal-insulator-semiconductor (MIS) technology the adaptation of MOS/MIS devices for use in random-access integrated circuit memories has become possible. Memory cells using these devices provide dynamic data storage using the parasitic capacitance associated with the lead and gate of the MOS/MIS device for storage. The basic principle of the dynamic mode lies in the capacity of the device to hold an electrical charge for a relatively long period of time; i.e., on the order of milliseconds. This permits the fabrication of memory cells with fewer components and less sophisticated processes than required for the more conventional static mode or conventional bipolar memory technology. A dynamic mode MOS memory to which the present invention typically relates is thoroughly discussed in U.S. Pat. No. 3,593,037 which issued to Marcian E. Hoff, Jr. on July 13, 1971. As is set forth in this reference, it is required that the contents of each dynamic mode MOS memory cell be refreshed periodically to maintain the charge stored on the capacitance inherent in the cell. It is further suggested in the reference that as information is read from the cells it may be recirculated via a one bit shift register and rewritten into the cell. Although this approach may work well in memories from which all information is read within any refresh period it will be inadequate for dynamic mode MOS memories used in applications where this requirement cannot be efficiently met.

OBJECTS AND SUMMARY OF THE INVENTION

From the preceding discussion it will be understood that among the various objectives of the present invention are:

To provide an improved MOS random-access integrated circuit memory system;

To provide apparatus of the above-described character wherein each memory cell is refreshed on a preselected periodic basis; and To provide apparatus of the above-described character wherein the cell refresh means are self-initiating.

These and other objectives of the present invention are efficiently achieved by providing self-initiating refresh circuitry in the MOS memory organization. The refresh circuitry essentially includes a free running clock coupled to and operative to trigger a refresh pulse generator at selected intervals. The refresh pulse generator output is coupled via gating circuitry and the memory row address drivers to the memory cells. Each row of memory cells is sequentially refreshed at least once during a preselected time period. A row address counter generates an appropriate address field for row selection during each refresh period and also initiates necessary memory access signals.

The foregoing as well as other objects, features and advantages of the present invention will become more apparent from the following detailed description taken in conjunction with the appended drawings.

DESCRIPTION OF PREFERRED EMBODIMENT

Figure 1:
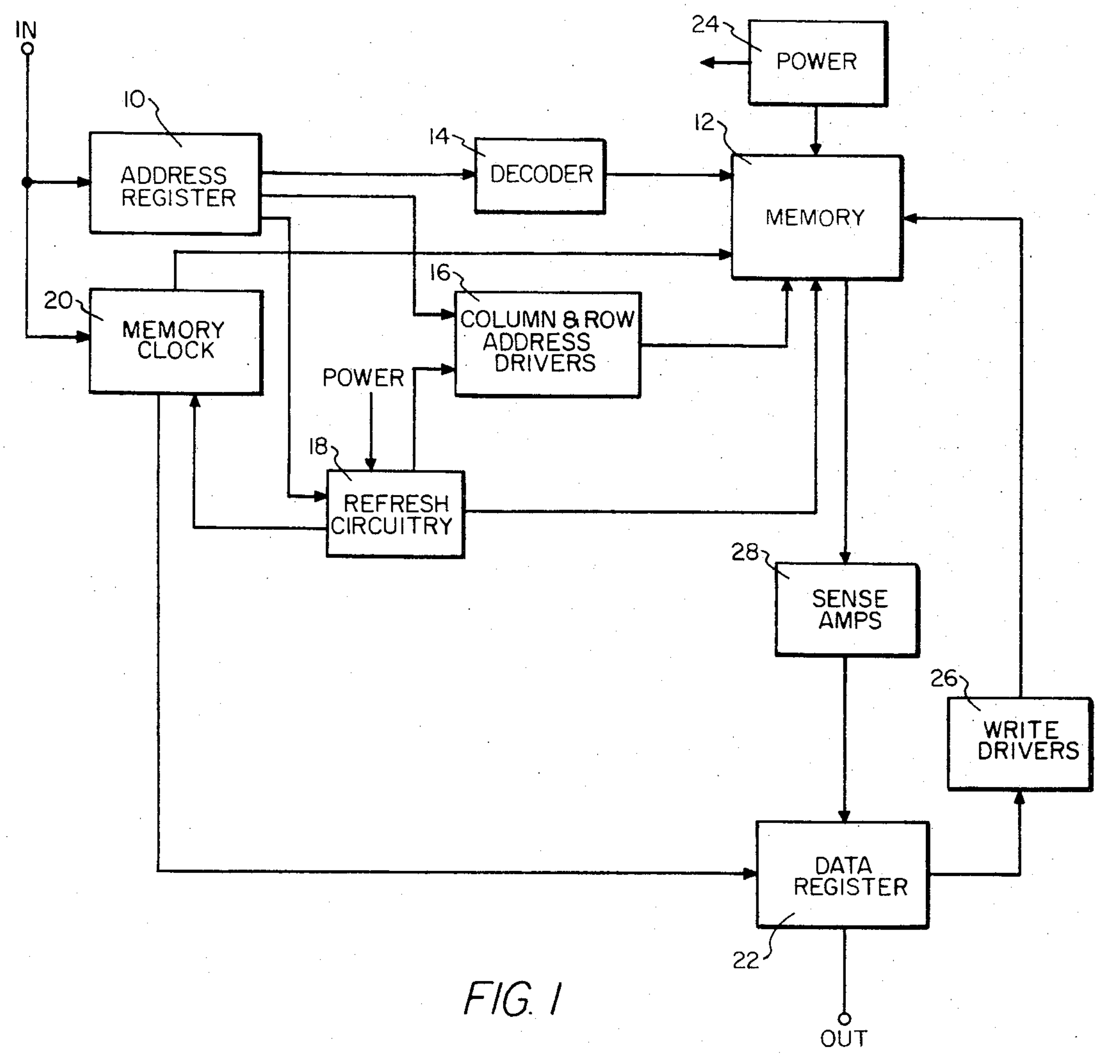
FIG. 1 is a schematic block diagram of a memory system incorporating the improvement of the present invention.

Turning to FIG. 1 there is illustrated in schematic block form a memory system incorporating the self-initiating refresh provision of the present invention. Since such memory systems are known in the digital data processing arts it will be described only insofar as is necessary to set forth the cooperative relationship of the apparatus of the present invention. The memory system input is generally coupled via a cable receiver (not shown) to an address register 10 containing the integrated circuit chip, column and row addresses of the memory 12. Chip addresses are generally applied via a decoder 14 to the gating, enabling and driver circuitry of the individual memory chips which are taken to include the memory circuitry such as the necessary column enable, write and precharge driver circuitry. Column addresses are applied to the memory 12 through the address drive circuitry 16 and row addresses are applied via the refresh circuitry 18 of the present invention and the address drive circuitry 16 to the memory 12. The memory system input is also coupled to the memory clock 20 which provides timing signals to the data register 22 and enabling signals to the memory 12. The memory 12 is coupled to a suitable source of power 24 and appropriate write driving circuitry 26. The memory output is coupled via sense amplifiers 28 and data register 22 to the memory systems output. Since the present invention is deemed to reside in the refresh circuitry 18, further description of the other elements of the memory system which are well known to those skilled in the art is considered superfluous.

Figure 2:
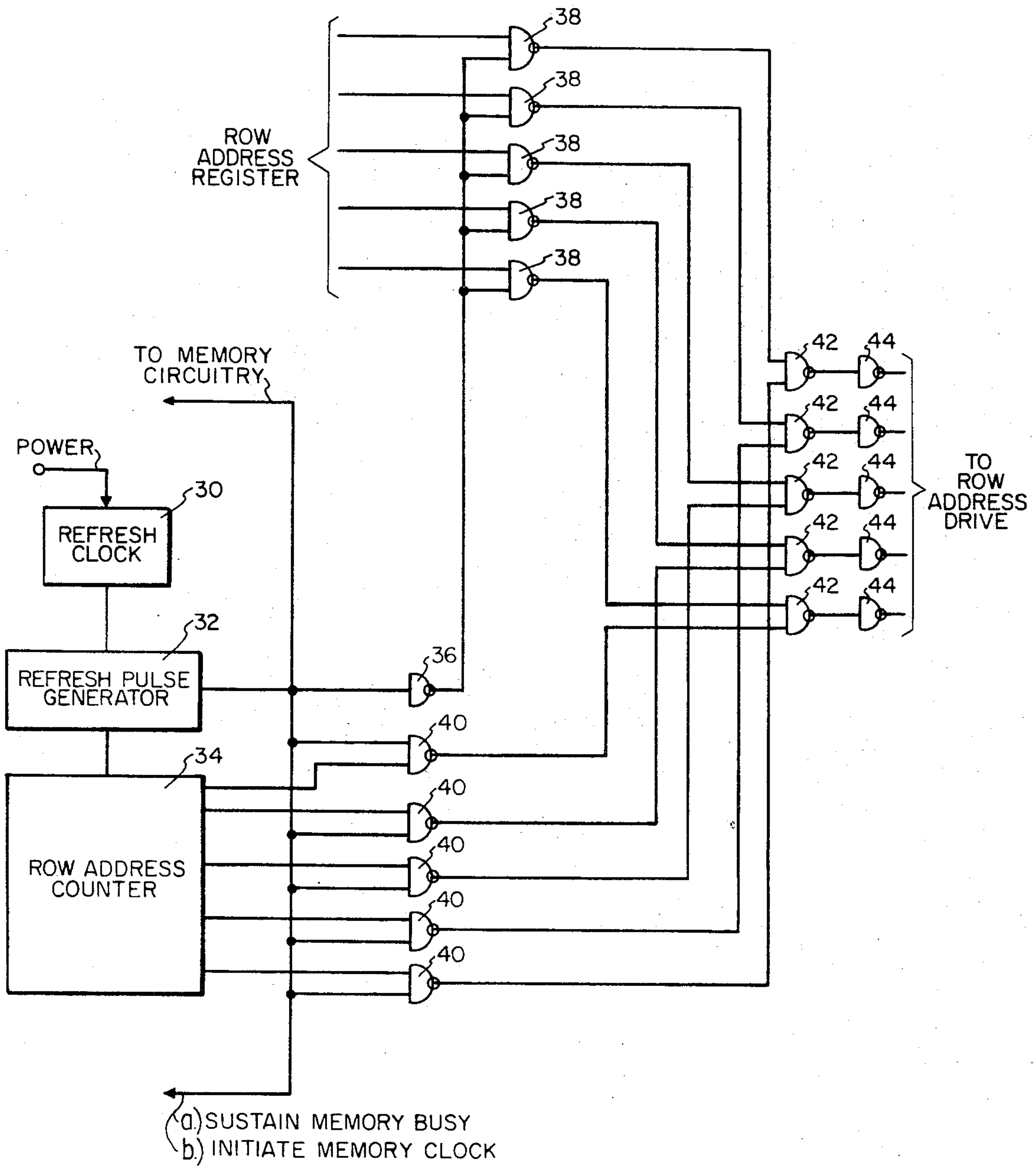
FIG. 2 is a more detailed schematic diagram of a memory refresh arrangement in accordance with the principles of the present invention.

With reference now to FIG. 2 there is schematically illustrated in more detail the refresh circuitry of the present invention. For the purposes of illustration the structure and operation of the present invention will be described with reference to the refresh requirements of the INTEL 1103 MOS memory chip which is commercially available from Intel Corporation of Mountain View, Calif. Each such chip contains a total of 1024 memory cells (bits) organized in a 32 × 32 matrix which appears as a 1024 × 1 memory at its output terminals. Each chip further includes 5 bit decoding for the row and 5 bit column addressing. With this memory chip it is necessary that each bit in the memory be refreshed at least once every 2 milliseconds. To this end the present invention provides a free running clock 30 such as a crystal controlled oscillator operating whenever power is applied to the memory system to trigger a refresh pulse generator 32 at a rate sufficiently high to provide a refresh pulse to each row in the memory matrix at least once during each refresh period. For the above-described INTEL 1103 memory chip a clock frequency of 16 kilohertz will trigger the refresh pulse generator 32 once every 62.5 microseconds which provides a refresh pulse for each of the 32 rows in the memory matrix within the specified 2 millisecond refresh cycle. The refresh pulse generator 32 is coupled to and operates to activate all column enable and precharge circuitry of the memory 12 during the refresh cycle, thus permitting simultaneous refresh of a selected row of all memory chips. Using simultaneous refresh of all memory chips provides a considerable saving of time relative to that which would be required if refresh pulses were applied to only one ship at a time as used in normal memory operation. The refresh pulse generator 32 may, for example be a model SN74121 monostable multivibrator available from Texas Instruments of Dallas, Texas. It generates a square, positive going pulse of an amplitude compatible with standard logic levels; typically 5 volts, and having a pulse width substantially equal to the cycle time of the memory. The output pulses are thus of sufficient duration to enable a memory interrogation of one row to take place. The refresh pulse generator 32 is also coupled to and operative to step a row address counter 34 once per interrogation. The row address counter 34 is a conventional binary counter; e.g. two Texas Instruments model Sn 74163 binary counters, having a capacity consistent with the row addresses used in the memory. In the illustrated example a five bit binary counter is used to generate an address field for row selection when the refresh period is in effect. The row address counter 34 advances sequentially, hence one row out of the 32 in each memory chip is refreshed every 62.5 microseconds and all rows of a chip are accessed at least once during each refresh cycle.

The refresh pulse generator 32 output is coupled to the memory clock circuitry (FIG. 1) such that all memory controlling pulses are provided to allow memory interrogation by the refresh circuitry of a selected row on all chips in the memory simultaneously. A "memory busy" signal is also sustained which indicates to equipment interfacing with the memory that the memory will not respond to external addressing during the refresh period.

The pulsed output of the refresh pulse generator 32 is gated via an inverter 36 with the enabling signals from the row address register (FIG. 1) in memory address gates 38, one for each row address bit and with the row address counter 34 output in row address counter gates 40 to provide first and second intermediate refresh signals. The outputs of gates 38 and 40 are gated on a bit by bit basis in refresh output gates 42 the outputs from which are coupled via inverters 44 to the memory row address drive circuits (FIG. 1). This gating arrangement enables the row address specified by the row address counter 34 during a refresh period and locks out this address field at all other times when true row address field from the external hardware is in effect.

It will be understood that through the practice of the present invention each memory cell of an integrated circuit dynamic memory is refreshed on a cyclic basis. If a memory access is attempted by external circuits during the refresh cycle, this access will be deferred until completion of the refresh cycle. This deferring of action is indicated by the memory busy signal provided by the refresh pulse generator and involves a maximum delay of a single refresh period which as stated hereinabove is the normal cycle time of a single memory word.

From the foregoing it will be seen that the Applicant has provided an improvement in integrated circuit dynamic memories whereby the objectives set forth hereinabove are efficiently met. Since certain changes in the above-described construction will occur to those skilled in the art without departure from the scope of the invention it is intended that all matter contained in the preceding description or shown in the appended drawings shall be interpreted as illustrative and not in a limiting sense.

Having described what is new and novel and desired to secure by Letters Patent, what is claimed is:

1. In combination with an integrated circuit dynamic mode memory system including an integrated circuit memory matrix, a memory clock, a memory address register, and memory address drivers, a memory refresh apparatus comprising a refresh pulse generator for generating refresh voltage pulses of preselected polarity and amplitude and of a pulse width substantially equal to the cycle time of said memory;

a free running clock coupled to and operative to trigger said refresh pulse generator at a rate proportional to the number of rows in said memory matrix;

a row address counter coupled to said refresh pulse generator and responsive to pulses from said generator to sequentially access each said memory address; and gating circuitry coupled to said memory address register, to said refresh pulse generator, and to said row address counter for sequentially applying said refresh pulses to said memory address drivers such that each bit in said memory is refreshed at least once during a selected time interval.

2. Apparatus as recited in claim 1 wherein said row address counter is a binary counter having a capacity proportional to the number of rows in said memory matrix.

3. Apparatus as recited in claim 1 wherein said free running clock comprises a crystal controlled oscillator.

4. Apparatus as recited in claim 1 wherein the output of said refresh pulse generator is coupled to said memory clock to thereby provide selective memory interrogation by said refresh apparatus and prevent external addressing of said memory.

5. Apparatus as recited in claim 1 wherein said refresh pulse generator is a monostable multivibrator.

6. Apparatus as recited in claim 1 wherein said gating circuitry includes a plurality of row address gates wherein the output of said refresh pulse generator is gated with each bit of the output of said memory address register, a plurality of row address counter gates wherein the output of said refresh pulse generator is gated with each bit of the output of said row address counter, and a plurality of refresh output gates wherein each bit of the output from said row address gates is gated with a corresponding bit of the output from said row address counter gates.

7. Apparatus as recited in claim 6 further including an inverter coupled between the output of said refresh pulse generator and said row address gates.

8. Apparatus as recited in claim 6 further including a plurality of inverters, one coupled between the output of each said refresh output gate and said memory address drivers.

* * * * *